US012694804B2

(12) United States Patent
Guo et al.

(10) Patent No.: US 12,694,804 B2
(45) Date of Patent: Jul. 28, 2026

(54) BRACKET STRUCTURE, SUB-DISPLAY PANEL ASSEMBLY AND SPLICED DISPLAY APPARATUS

(71) Applicants: BOE MLED Technology Co., Ltd., Beijing (CN); BOE Technology Group Co., Ltd., Beijing (CN)

(72) Inventors: Shaofei Guo, Beijing (CN); Shipeng Wang, Beijing (CN); Chao Tian, Beijing (CN); Zhonghua Li, Beijing (CN); Yiping Ruan, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 328 days.

(21) Appl. No.: 18/557,924

(22) PCT Filed: Oct. 31, 2022

(86) PCT No.: PCT/CN2022/128527
§ 371 (c)(1),
(2) Date: Oct. 27, 2023

(87) PCT Pub. No.: WO2024/092382
PCT Pub. Date: May 10, 2024

(65) Prior Publication Data
US 2025/0084880 A1 Mar. 13, 2025

(51) Int. Cl.
*G09F 9/302* (2006.01)

(52) U.S. Cl.
CPC .................................... *G09F 9/302* (2013.01)

(58) Field of Classification Search
CPC ...... G09F 9/3023; G09F 9/302; G09F 9/3026; F16B 5/0225; F16B 5/0004
See application file for complete search history.

(56) References Cited

U.S. PATENT DOCUMENTS

| | | | | |
|---|---|---|---|---|
| 9,845,816 | B2 * | 12/2017 | Brashnyk | G09F 9/33 |
| 11,573,613 | B2 * | 2/2023 | Mori | G06F 1/1601 |
| 12,232,276 | B2 * | 2/2025 | Zhao | G09F 9/302 |
| 2016/0231976 | A1 * | 8/2016 | Ryu | G06F 3/1446 |
| 2017/0006727 | A1 * | 1/2017 | Ryu | H01L 25/0753 |

(Continued)

FOREIGN PATENT DOCUMENTS

| | | | | |
|---|---|---|---|---|
| CN | 114399954 A * | 4/2022 | | G09F 9/33 |
| KR | 101060291 B1 * | 8/2011 | | G09F 13/22 |

*Primary Examiner* — Eret C Mcnichols

(57) ABSTRACT

The present disclosure provides a bracket structure, which includes: a bracket body and at least one adjusting structure, the bracket body have a supporting surface, an assembly surface and at least one side surface, the supporting surface is disposed opposite to the assembly surface in a first direction, and the side surface is located between the supporting surface and the assembly surface; the at least one side surface is provided with at least one duct extending towards the assembly surface, the assembly surface is provided with a first opening corresponding to the duct, and the first opening is communicated with the corresponding duct; the adjusting structure is configured such that at least a portion of the adjusting structure, in response to an external adjustment, can move along the duct and change the protrusion amount of the adjusting structure protruding from the assembly surface through the first opening.

20 Claims, 8 Drawing Sheets

(56) References Cited

U.S. PATENT DOCUMENTS

| | | | | |
|---|---|---|---|---|
| 2017/0127538 | A1* | 5/2017 | Westhoff | G09F 9/3026 |
| 2023/0267856 | A1* | 8/2023 | Zhang | G09F 9/3026 361/679.01 |
| 2024/0260202 | A1* | 8/2024 | Cho | G02F 1/133314 |
| 2025/0185199 | A1* | 6/2025 | Kim | G06F 1/1607 |

* cited by examiner

BRACKET STRUCTURE, SUB-DISPLAY PANEL ASSEMBLY AND SPLICED DISPLAY APPARATUS

CROSS-REFERENCE TO RELATED APPLICATION

The present application is a U.S. National Phase Entry of International PCT Application No. PCT/CN2022/128527 having an international filing date of Oct. 31, 2022, the above-identified application is incorporated by reference herein in their entirety.

TECHNICAL FIELD

The present disclosure relates to the display field, in particular to a bracket structure, a sub-display panel assembly and a spliced display apparatus.

BACKGROUND

With the rapid development of display technology, spliced display apparatuses have been more and more widely used in large places such as shopping malls, cinemas, stadiums, etc., which not only solves the technical problems of high cost and difficult maintenance of a single large screen, but also has high scalability and can be applied to the display of images of various sizes.

The spliced display apparatus is formed by splicing a plurality of sub-display panel assemblies, wherein the sub-display panel assemblies include a display substrate and a bracket structure for supporting the display substrate.

SUMMARY

In a first aspect, an embodiment of the present disclosure provides a bracket structure including: a bracket body and at least one adjusting structure, the bracket body have a supporting surface, an assembly surface and at least one side surface, the supporting surface is disposed opposite to the assembly surface in a first direction, and the side surface is located between the supporting surface and the assembly surface;

- the at least one side surface is provided with at least one duct extending towards the assembly surface, the extension direction of the duct intersects with the assembly surface, the assembly surface is provided with a first opening corresponding to the duct, and the first opening is communicated with the corresponding duct;
- the adjusting structure is configured such that at least a portion of the adjusting structure, in response to an external adjustment, can move along the duct and change the protrusion amount of the adjusting structure protruding from the assembly surface through the first opening.

In some embodiments, the duct extends from the side surface to the assembly surface in a preset extension direction.

In some embodiments, the adjusting structure includes: a machine-processed rice screw, and an internal thread matched with an external thread of the machine-processed rice screw is arranged in the duct.

In some embodiments, a receiving hole communicating with the first opening is formed in the bracket body at a position corresponding to the first opening, and the duct is connected to a side wall of the receiving hole;

- the adjusting structure includes: a first adjusting substructure which is located in the duct and can move along the duct and a second adjusting substructure which is located in the receiving hole and can move along a direction perpendicular to the assembly surface;
- the first adjusting substructure is configured to move along the duct to adjust a protrusion amount of the first adjusting substructure from a sidewall of the receiving hole in response to an external adjustment;
- the second adjusting substructure is configured to come into contact with the portion of the first adjusting substructure protruding from the side wall of the receiving hole, and is moved in a direction close to or away from the first opening in response to control of movement of the first adjusting substructure, to adjust a protrusion amount of the second adjusting substructure from the assembly surface through the first opening.

In some embodiments, when the second adjusting substructure comes into contact with the portion of the first adjusting substructure protruding from the side wall of the receiving hole, the second adjusting substructure moves in the receiving hole in a direction close to the first opening in response to the first adjusting substructure moving along the duct in a direction close to the assembly surface, and the second adjusting substructure moves in the receiving hole in a direction away from the first opening in response to the first adjusting substructure moving along the duct in a direction away from the assembly surface.

In some embodiments, the second adjusting substructure includes: a first portion close to the first opening;

- the sectional area of the first portion parallel to the assembly surface gradually increases in a direction along the first direction and directed from the assembly surface to the supporting surface;
- the area of the first opening is less than the maximum sectional area of the first portion parallel to the assembly surface.

In some embodiments, the sectional area of the receiving hole in parallel to the assembly surface gradually increases in a direction along the first direction and directed from the assembly surface to the supporting surface.

In some embodiments, the first portion is hemispherical, conical, or frustoconical.

In some embodiments, the first portion is hemispherical, and the second adjusting substructure is spherical.

In some embodiments, a first bayonet structure is formed at the first opening.

In some embodiments, the second adjusting substructure includes: a limiting component, a telescopic rod and an elastic component, and a second bayonet structure for the protrusion of the telescopic rod is formed at the first opening;

the limiting component is fixed at an end of the telescopic rod close to the supporting surface, one end of the elastic component is connected with the limiting component, and the other end of the elastic component is connected with the second bayonet structure.

In some embodiments, the receiving hole includes: a first portion and a second portion disposed in the first direction, the first portion is located on a side of the second portion away from the assembly surface, and the duct is connected to a sidewall of the first portion;

the sectional area of the limiting component parallel to the assembly surface is less than the sectional area of the first portion parallel to the assembly surface, the sectional area of the limiting component parallel to the assembly surface is greater than the sectional area of the second portion parallel to the assembly surface, and the sectional area of the second portion parallel to the assembly surface is greater than the sectional area of the telescopic rod parallel to the assembly surface.

In some embodiments, the receiving hole is connected to the supporting surface.

In some embodiments, the first adjusting substructure includes: a machine-processed rice screw, and an internal thread matched with an external thread of the machine-processed rice screw is arranged in the duct.

In some embodiments, the bracket body includes at least one corner area, a first side surface, a second side surface, and a chamfered side surface connected between the first side surface and the second side surface are provided in the corner area;

the chamfered side surface is provided with the duct.

In some embodiments, the duct is provided on the first side surface, the second side surface and the chamfered side surface in a same corner area.

In some embodiments, in a same corner area, the duct on the first side surface, the duct on the second side surface and the duct on the chamfered side surface correspond to the same first opening.

In some embodiments, in the corner area, the first side surface includes a first area close to the supporting surface and a second area close to the assembly surface, the second side surface includes a third area close to the supporting surface and a fourth area close to the assembly surface, the first area and the second area are arranged along the first direction, the third area and the fourth area are arranged along the first direction;

the first area is directly connected to the third area, and the second area is connected to the fourth area through the chamfered side surface.

In some embodiments, the bracket body is in a shape of rectangle, and the bracket body includes four corner areas.

In some embodiments, an angle between the extension direction of the duct and the first direction is 20° to 80°.

In a second aspect, an embodiment of the present disclosure also provide a sub-display panel assembly, wherein the bracket structure as provided in the first aspect and the display substrate are included, and the supporting surface in the bracket structure carries the display substrate.

In a third aspect, an embodiment of the present disclosure also provides a spliced display apparatus including a plurality of sub-display panel assemblies and a housing for assembling the sub-display panel assemblies, at least one of the sub-display panel assemblies adopts the sub-display panel assembly as provided in the second aspect.

DETAILED DESCRIPTION

Figure 1:
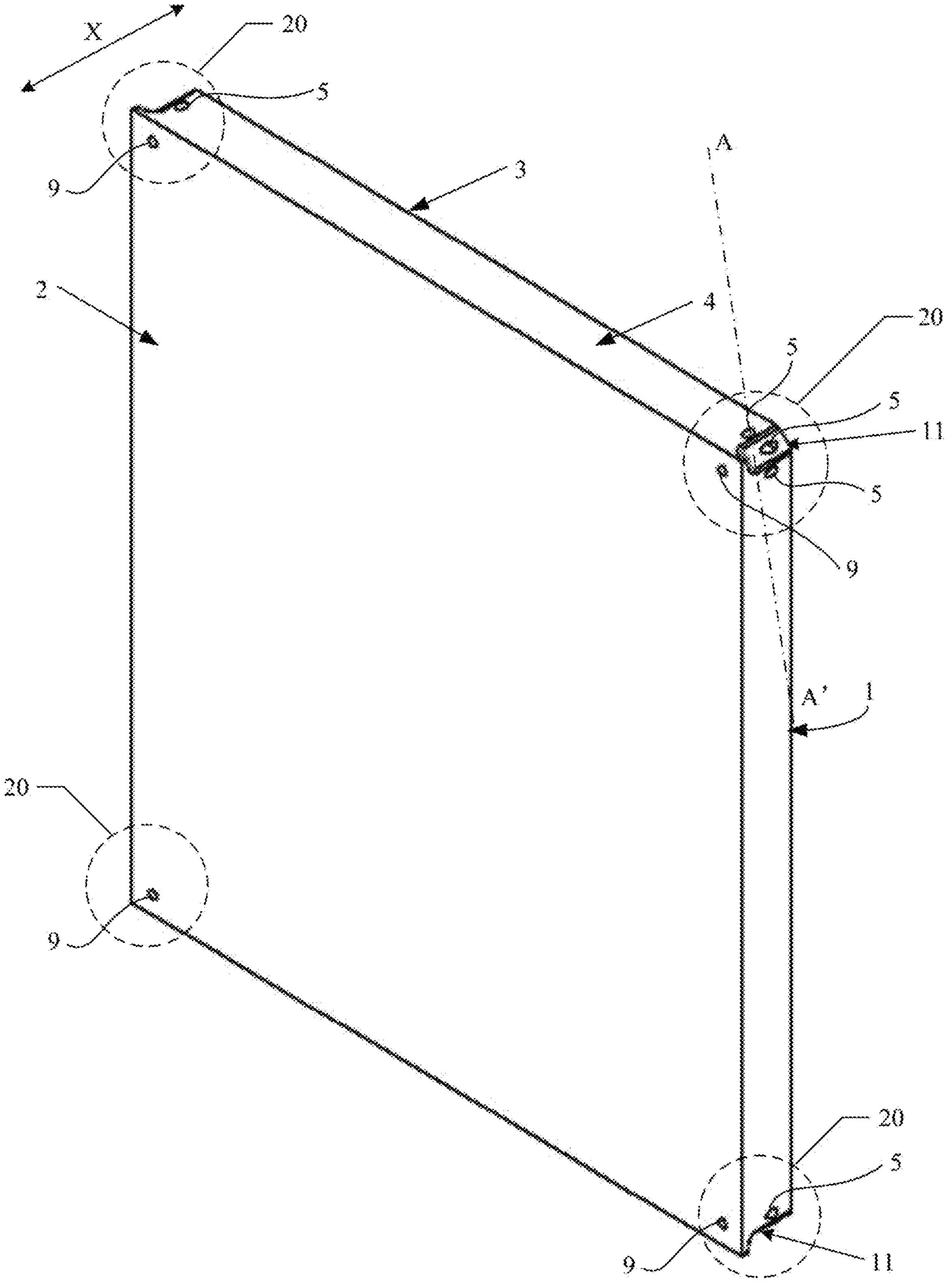
FIG. 1 is a schematic diagram of a structure of a bracket structure provided in an embodiment of the present disclosure.

To enable those skilled in the art to better understand technical solutions of the present disclosure, the present disclosure is described in further detail below in conjunction with the accompanying drawings and specific implementations.

The present disclosure will be described in more detail below with reference to the accompanying drawings. Throughout the various drawings, same elements are denoted by similar reference numerals. For the sake of clarity, not all parts in the drawings are drawn to scale. In addition, some well-known parts may not be shown in the drawings.

Many specific details of the present disclosure such as the structure, materials, dimensions, treatment processes, and techniques of the components are described below for a clearer understanding of the present disclosure. However, as those skilled in the art can appreciate, the present disclosure may be realized without following these particular details.

"First", "second", and similar terms used in the embodiments of the present disclosure do not represent any order, quantity, or importance, but are only used for distinguishing different components. Similarly, "include", "contain", or similar words mean that elements or objects appearing before the words cover elements or objects listed after the words and their equivalents, but do not exclude other elements or objects. Similar words such as "connected" or "connected with" between two structures include not only the direct contact of two structures to achieve connection, but also the indirect connection of the two structures through other structures.

In addition, the formation of "fixation" between two structures in the present disclosure merely means that the two structures cannot be separated in a certain state or moment, but the two structures may also be separated in other states or moments. For example, when a screw is screwed into a corresponding screw hole, the screw is fixed to the screw hole, but the screw may also be screwed out of the screw hole so that the screw is separated from the screw hole.

In addition, in the description of the range A to B in the present disclosure, the specified range includes both endpoint values A and B.

The spliced display apparatus includes a housing and a plurality of sub-display panel assemblies assembled on the housing, wherein, the sub-display panel assembly includes a display substrate and a bracket structure, the bracket structure is provided with a supporting surface, and the distance between the supporting surface and the surface of the housing is the supporting height of the bracket structure.

In practical applications, it is found that after the sub-display panel assemblies are assembled on the housing, due to factors such as assembly errors during the assembly process, there may be problems such as an inclination of the supporting surface of the bracket structure and a deviation of the actual supporting height of the bracket structure from the pre-designed supporting height in the currently assembled sub-display panel assembly, which leads to the segment difference between the supporting surface of the bracket structure within the currently assembled sub-display panel assembly and the supporting surface of the bracket structure within the sub-display panel assembly already assembled on the housing; at this time, the display surface of the display substrate within the presently assembled sub-display panel assembly is not on a same plane as the display surface of the display substrate within the sub-display panel assembly already assembled on the housing. When the spliced display apparatus displays a picture, in the area where at least two sub-display panel assemblies with the segment difference are located, the picture will have a concave-convex feeling or a split feeling, which greatly affects the overall picture display effect of the spliced display apparatus.

In the related technology, when the segment difference between the supporting surfaces of the bracket structures is adjusted, it is necessary to disassemble all sub-display panel assemblies from the housing, and then reassemble the sub-display panel assemblies to the housing to adjust the position of the supporting surfaces of the bracket structures within the sub-display panel assemblies, so as to eliminate the segment difference between the supporting surface of the bracket structure within the sub-display panel assembly currently assembled and the supporting surface of the bracket structure within the sub-display panel assembly already assembled on the housing, and achieve the adjustment of segment difference. However, in the related technology, this way of adjusting the segment difference by reassembling will lead to low assembly efficiency of the spliced display apparatus; in addition, during the reassembly process, it is inevitable that assembly errors will still exist, which makes it difficult to adjust the segment difference accurately, and may lead to the phenomenon that a same sub-display panel assembly has been reassembled many times.

In the related technology, it has been proposed to set up an adjustment mechanism based on magnetic force or back jackscrew on the bracket structure to achieve the adjustment of segment difference. However, it is limited by the complexity of the overall coordination scheme and the difficulty of practical on-site operations. It also has limitations in terms of adjustment space both forward and backward. At the same time, it is sometimes hindered by the presence of the back mounting racks, making effective adjustments impossible.

Figure 2:
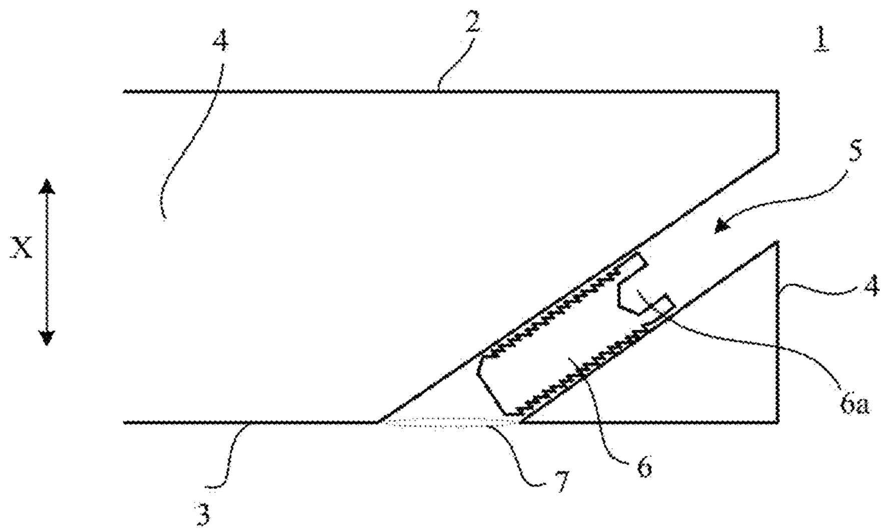
FIG. 2 is a schematic cross-sectional view of an adjusting structure in an embodiment of the present disclosure.
Figure 3:
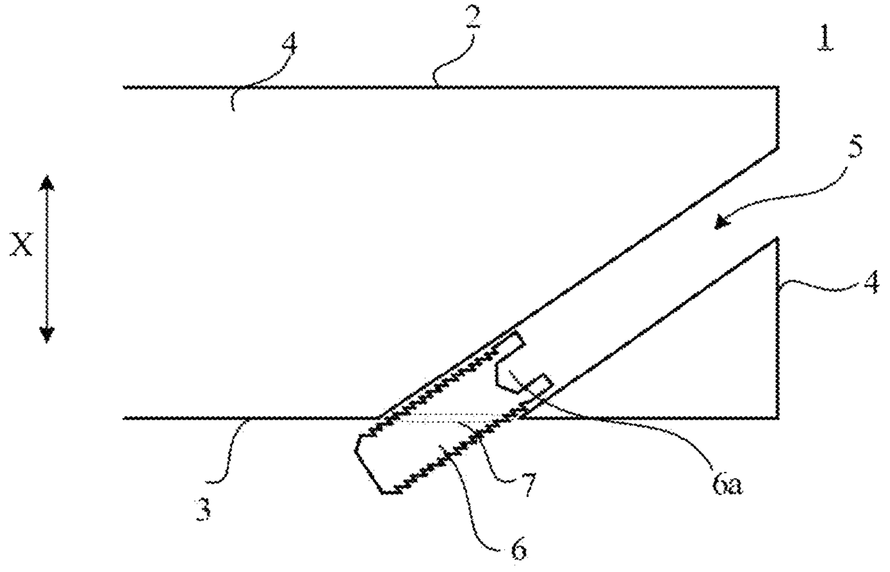
FIG. 3 is a schematic view of the machine-processed rice screw in FIG. 2 as it protrudes from a first opening.
Figure 4:
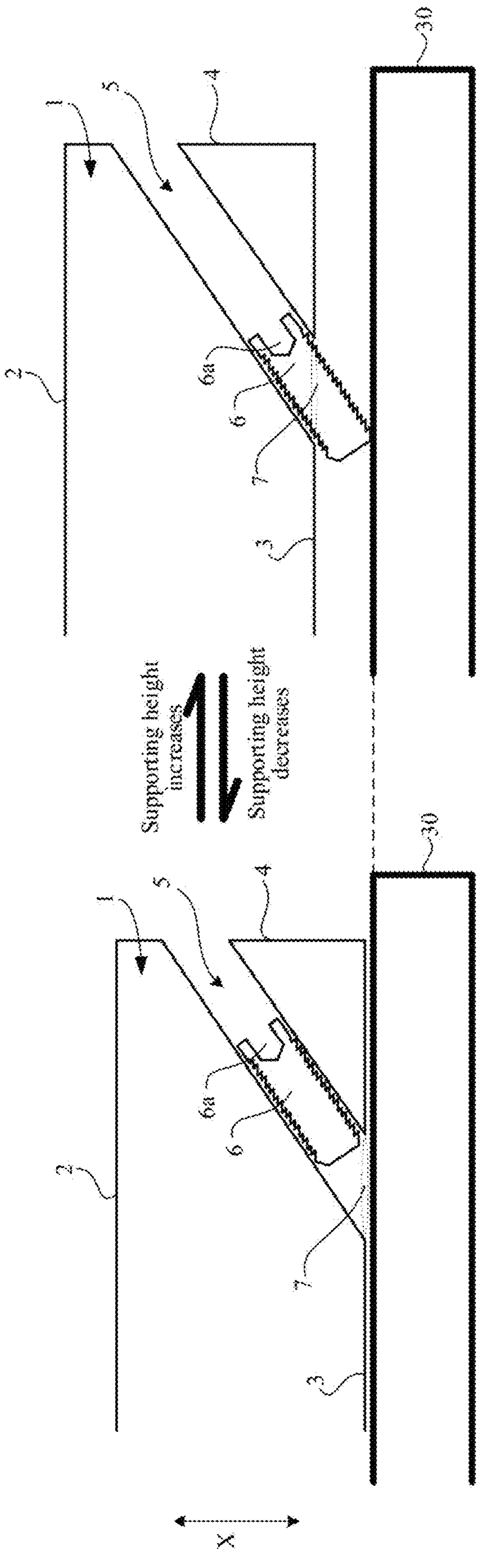
FIG. 4 is a schematic diagram of adjusting the distance between the supporting surface of the bracket structure and the surface of a housing by an adjusting structure in an embodiment of the present disclosure.

FIG. 1 is a schematic diagram of a structure of a bracket structure provided in an embodiment of the present disclosure. FIG. 2 is a schematic cross-sectional view of an adjusting structure in an embodiment of the present disclosure. FIG. 3 is a schematic view of the machine-processed rice screw in FIG. 2 as it protrudes from a first opening. FIG. 4 is a schematic diagram of adjusting the distance between the supporting surface of the bracket structure and the surface of a housing by an adjusting structure in an embodiment of the present disclosure. The cross-sectional view in FIGS. 2-8 is taken along the section line AA' in FIG. 1. As shown in FIGS. 1 to 4, the bracket structure includes: a bracket body 1 and at least one adjusting structure 6, the bracket body have a supporting surface 2, an assembly surface 3 and at least one side surface 4, the supporting surface 2 is disposed opposite to the assembly surface 3 in a first direction X, the side surface 4 is connected with the supporting surface 2 and the assembly surface 3; the at least one side surface 4 is provided with at least one duct 5, the extension direction of the duct 5 intersects with the assembly surface 3, the assembly surface 3 is provided with a first opening 7, which is communicated with the corresponding duct 5; the adjusting structure 6 is configured such that at least a portion of the adjusting structure 6, in response to an external adjustment, can move along the duct 5 and change the protrusion amount of the adjusting structure 6 protruding from the assembly surface 3 through the first opening 7.

In an embodiment of the present disclosure, the supporting surface 2 on the bracket body 1 is a surface on the bracket body 1 for supporting a display substrate, in particular, the display substrate can be fixed on the supporting surface; the assembly surface 3 on the bracket body 1 is a surface of the bracket body 1 that faces the housing 30 and is mutually assembled with the housing 30, and the two can be mutually assembled by means of, for example, matching a positioning hole with a positioning column, magnetic attachment, suction cup fixing, etc. The fixation method between the bracket body 1 and the housing 30 is not limited in this disclosure.

When it is necessary to adjust the position of the supporting surface 2 of the bracket structure to perform the adjustment of the segment difference, only adjustment of the portion of the adjusting structure 6 located in the duct 5 through the duct 5 is required, so that at least a portion of the adjusting structure 6 can move along the duct 5 and change the protrusion amount of the adjusting structure 6 protruding from the assembly surface 3 through the first opening 7; the distance between the assembly surface 3 and the surface of the housing 30 at the corresponding position when the bracket structure and the housing 30 are assembled can be adjusted by changing the protrusion amount of the adjusting structure 6 protruding from the assembly surface 3, so that the distance between the supporting surface 2 of the bracket structure and the surface of the housing 30 is changed, and the adjustment of segment difference can be realized. Herein, the larger the protrusion amount of the adjusting structure 6 protruding from the assembly surface 3, the larger the distance between the assembly surface 3 and the housing 30 at the corresponding position; the less the protrusion amount of the adjusting structure 6 protruding from the assembly surface 3, the less the distance between the assembly surface 3 and the housing 30 at the corresponding position.

In an embodiment of the present disclosure, when an issue of segment difference occurs, the adjustment of the position of the bracket structure can be realized without removing the bracket structure from the housing 30, so that the segment difference between the supporting surfaces 2 of different bracket structures can be effectively repaired. Compared with the related technology, since the segment difference adjustment scheme in the present disclosure omits the process of "disassembling first and then reassembling", technical solutions of the present disclosure can effectively improve the assembly efficiency of the spliced display apparatus; moreover, technical solutions of the present disclosure can accurately control the protrusion amount of the adjusting structure 6 protruding from the assembly surface 3, that is, can accurately adjust the position of the supporting surface 2 of the bracket structure, so that the segment difference can be accurately adjusted.

In addition, since the duct 5 is located on the side surface 4 of the bracket structure, there is no requirement on the installation environment of the front and rear sides of the sub-display panel assembly (the space on one side of the display substrate facing away from the bracket structure and the space on one side of the bracket structure facing away from the display substrate) during the adjustment process of the position of the supporting surface 2 of the bracket structure. Therefore, it has strong applicability. Furthermore, since the duct 5 extends obliquely from the side surface 4 of the bracket body 1 toward the assembly surface 3, the external jig used for operating the adjusting structure 6 can be obliquely inserted into the duct 5 from the space on a side of the plane where the supporting surface 2 is located away from the assembly surface 3, and the space where an assembler operates the external jig can also be located on a side of the plane where the supporting surface 2 is located away from the assembly surface 3, so that the assembler has greater operability and control when adjusting the adjusting structure 6 in the duct 5 using the external jig, and at the same time, the assembler can intuitively observe the variation in the segment difference between the supporting surface 2 of the adjusted bracket structure and the supporting surfaces 2 of other bracket structures during the operation of the external jig, which is beneficial to accurately adjusting the segment difference.

Referring further to FIGS. 2 to 4, as an alternative embodiment, the duct 5 extends from the side surface 4 to the assembly surface 3 in a preset extension direction. That is to say, the duct 5 directly traverses the side surface 4 and the assembly surface 3 in the preset extension direction; at this time, the adjusting structure 6 as a whole can move linearly along the duct 5, and the protrusion amount of the adjusting structure 6 protruding from the assembly surface 3 through the first opening 7 can be precisely controlled.

In some embodiments, the adjusting structure 6 includes a machine-processed rice screw, and the inner wall of the duct 5 is provided with an internal thread (not shown) matched with an external thread of the machine-processed rice screw. An adjusting groove 6*a* is provided at one end of the machine-processed rice screw facing the side surface 4, which can be adjusted by the external jig. The assembler can engage the adjusting groove 6*a* with the external jig and control the machine-processed rice screw to rotate, so as to control the machine-processed rice screw to move linearly along the duct 5 as a whole.

Herein, when the machine-processed rice screw moves toward a side close to the assembly surface 3 along the duct 5, the protrusion amount of the machine-processed rice screw protruding from the assembly surface 3 through the first opening 7 increases, and the distance between the assembly surface 3 and the housing at the corresponding position increases; when the machine-processed rice screw is moved toward a side away from the assembly surface 3 along the duct 5, the protrusion amount of the machine-processed rice screw protruding from the assembly surface 3 through the first opening 7 is reduced, and the distance between the assembly surface 3 and the housing at the corresponding position is reduced.

In some embodiments, the adjusting groove on the machine-processed rice screw may be in the form of a straight groove, a cross groove, a rectangular groove, a hexagonal groove, etc., which is not limited in the present disclosure.

Figure 5:
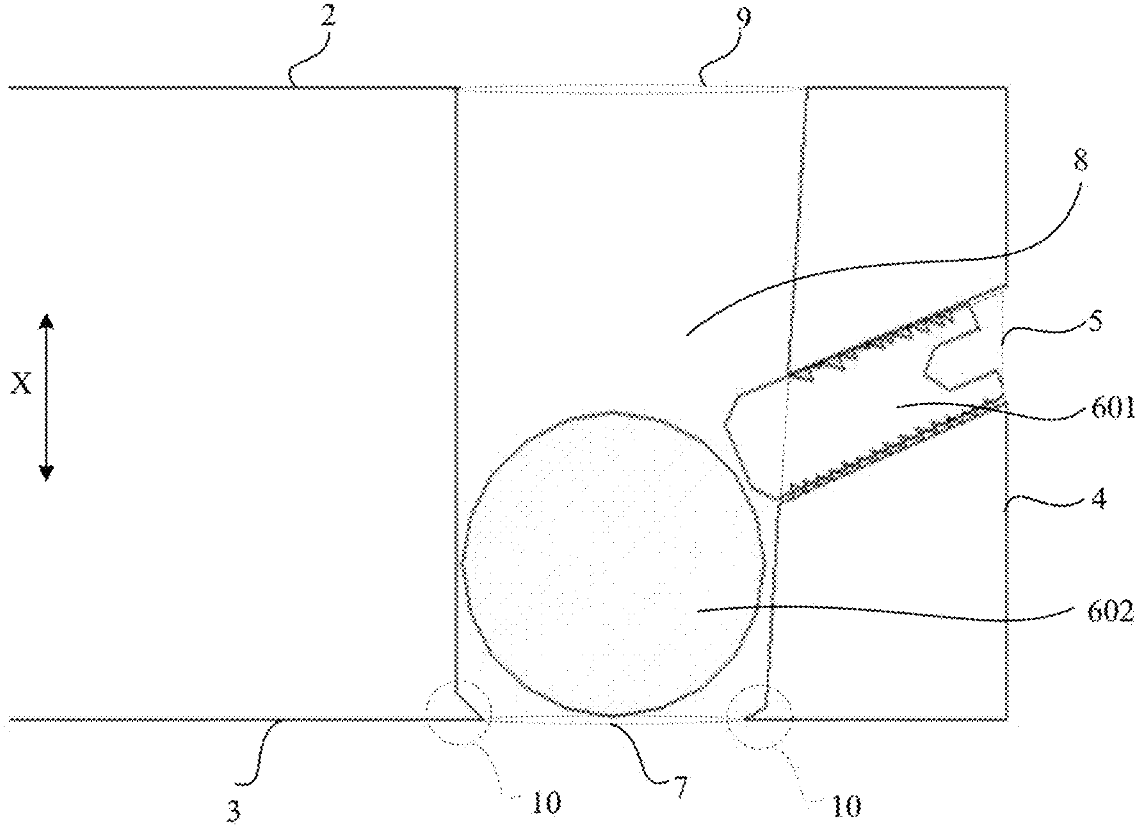
FIG. 5 is another schematic cross-sectional view of an adjusting structure in an embodiment of the present disclosure.
Figure 6:
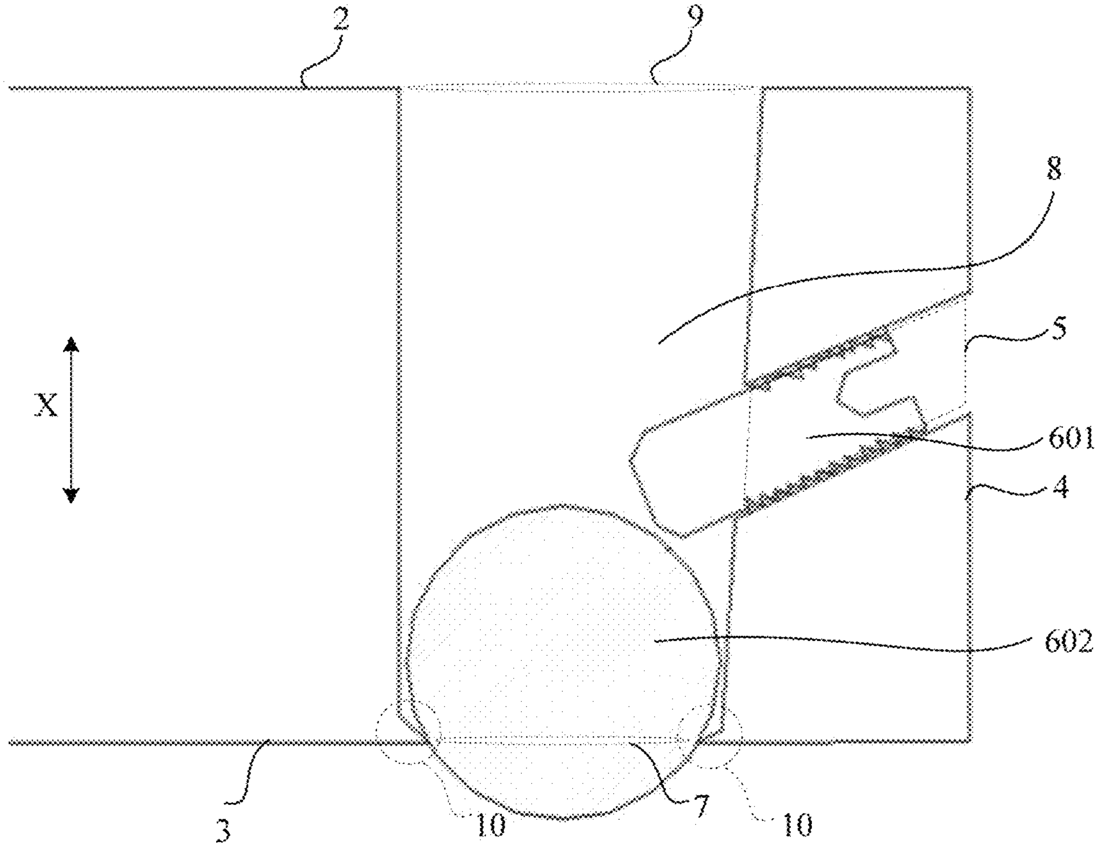
FIG. 6 is a schematic view of a second adjusting substructure in FIG. 5 as it protrudes from the first opening.
Figure 7:
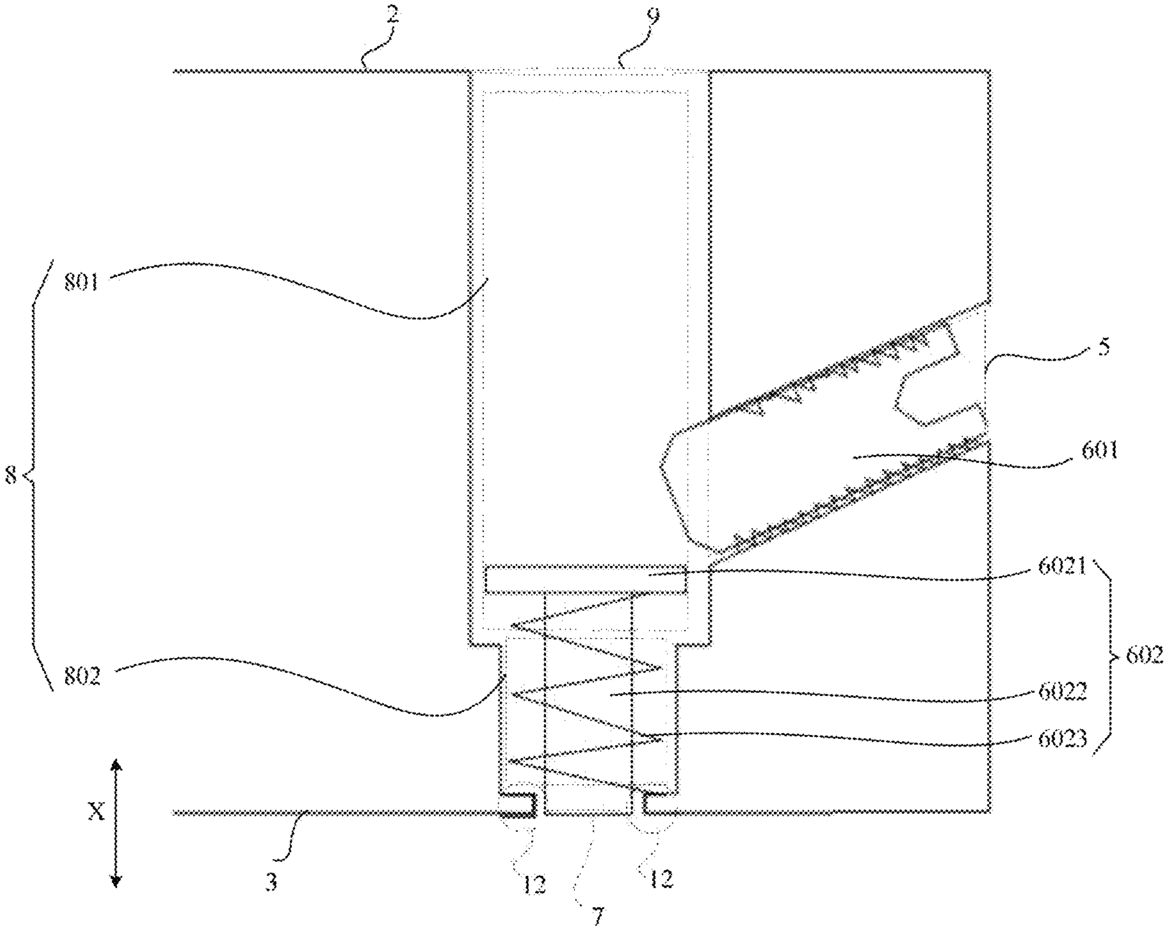
FIG. 7 is another schematic cross-sectional view of an adjusting structure in an embodiment of the present disclosure.
Figure 8:
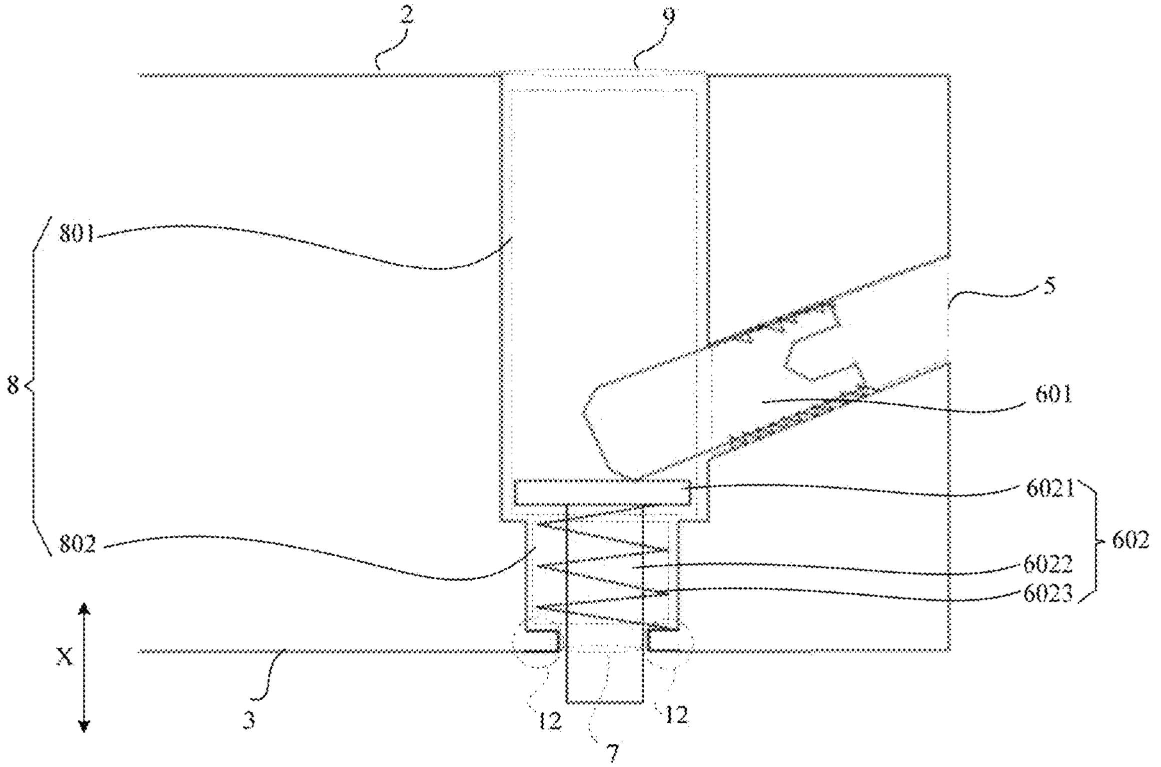
FIG. 8 is a schematic view of the second adjusting substructure in FIG. 7 as it protrudes from the first opening.

FIG. 5 is another schematic cross-sectional view of an adjusting structure in an embodiment of the present disclosure. FIG. 6 is a schematic view of a second adjusting substructure in FIG. 5 as it protrudes from the first opening. FIG. 7 is another schematic cross-sectional view of an adjusting structure in an embodiment of the present disclosure. FIG. 8 is a schematic view of the second adjusting substructure in FIG. 7 as it protrudes from the first opening. As shown in FIGS. 5 to 8, unlike the case in which the duct 5 directly traverses the side surface 4 and assembly surface 3 in the preset extension direction shown in FIGS. 2 and 3, in the case shown in FIGS. 5 and 7, a receiving hole 8 communicating with the first opening 7 is formed in the bracket body 1 at a position corresponding to the first opening 7, and the duct 5 communicates with the side wall of the receiving hole 8; the adjusting structure 6 includes a first adjusting substructure 601 located in the duct 5 and movable along the duct 5 and a second adjusting substructure 602 located in the receiving hole 8 and movable along the receiving hole 8; the first adjusting substructure 601 is configured to move along the duct 5 in response to external adjustment to adjust the protrusion amount of the first adjusting substructure 601 on the side wall of the receiving hole 8; the second adjusting substructure 602 is configured to come into contact with the portion of the first adjusting substructure 601 protruding from the side wall of the receiving hole 8, and is moved in a direction close to or away from the first opening 7 in response to control of the movement of the first adjusting substructure 601 to adjust the protrusion amount of the second adjusting substructure 602 protruding from assembly surface 3 through the first opening 7.

It should be noted that the receiving hole 8 in an embodiment of the present disclosure may be a through hole (for example, as shown in FIGS. 5 to 8) or a blind hole with a depth less than the width of the side surface of the bracket. In the present disclosure, it is only necessary to ensure that the receiving hole 8 is in communication with the first opening.

In some embodiments, the extending direction of the receiving hole 8 is at an angle of 30° to 90° with respect to the plane in which the assembly surface 3 is located.

In an embodiment of the present disclosure, the protrusion amount of the second adjusting substructure 602 protruding from the assembly surface 3 through the first opening 7 is adjusted by controlling the movement of the first adjusting substructure 601 along the duct 5 to control the movement of the second adjusting substructure 602 in a direction close to or away from the first opening 7 within the receiving hole 8.

In some embodiments, if the first adjusting substructure 601 moves in a direction close to the assembly surface 3 along the duct 5 when the second adjusting substructure 602 abuts the portion of the first adjusting substructure 601 protruding from the side wall of the receiving hole 8, the second adjusting substructure 602 moves in a direction close to the first opening 7 within the receiving hole 8 so that the protrusion amount of the second adjusting substructure 602 protruding from the assembly surface 3 through the first opening 7 increases; if the first adjusting substructure 601 is moved in a direction away from assembly surface 3 along the duct 5, the second adjusting substructure 602 is moved in a direction away from the first opening 7 in the receiving hole 8, so that the protrusion amount of the second adjusting substructure 602 protruding from assembly surface 3 through the first opening 7 is reduced.

Compared with the solution shown in FIG. 2, in which only the duct 5 is provided and the receiving hole 8 is not provided, in the solution shown in FIGS. 5 to 8, the placement position of the first opening 7 may be closer to the edge of the assembly surface 3.

Referring to FIGS. 5 and 6, the second adjusting substructure 602 includes a first portion close to the first opening 7; the sectional area of the first portion parallel to the assembly surface 3 gradually increases in a direction along the first direction X and directed from the assembly surface 3 to the supporting surface 2, and the area of the first opening 7 is less than the maximum sectional area of the first portion parallel to the assembly surface 3.

In some embodiments, the sectional area of the receiving hole 8 in parallel to the assembly surface 3 gradually increases in a direction along the first direction X and directed from the assembly surface 3 to the supporting surface 2. With the above design, the second adjusting substructure 602 can automatically move away from the first opening 7 due to the extrusion force from the side wall, when the protrusion amount of the first adjusting substructure 601 protruding from the side wall of the receiving hole 8 is reduced.

In some embodiments, the first portion is hemispherical, conical (e.g., cone-shaped or pyramid-shaped), or frustoconical (e.g., frustum cone-shaped or frustum pyramid-shaped).

In some embodiments, the first portion is hemispherical and the second adjusting substructure 602 is spherical. When the second adjusting substructure 602 is designed to be spherical, the lower half portion of the second adjusting substructure 602 is always hemispherical, so that there is no need to adjust the posture of the second adjusting substructure 602 in the receiving hole 8. As a specific example, the second adjusting substructure 602 may be a spherical structure made of a stainless steel material.

In some embodiments, a first bayonet structure 10 is formed at the first opening 7. The structure of the first opening 7 can effectively prevent the second adjusting substructure 602 from falling off from the receiving hole 8 while it can also provide the second adjusting substructure 602 with an extrusion in a direction away from the assembly surface 3, so that the second adjusting substructure 602 automatically moves in a direction away from the first opening 7 by the extrusion force of the first bayonet structure 10 when the protrusion amount of the first adjusting substructure 601 protruding from the side wall of the receiving hole 8 decreases.

Referring to FIGS. 7 and 8, unlike the second adjusting substructure 602 shown in FIGS. 5 and 6, the second adjusting substructure 602 in FIGS. 7 and 8 includes a limiting component 6021, a telescopic rod 6022 and an elastic component 6023, and a second bayonet structure 12 for the protrusion of the telescopic rod 6022 is formed at the first opening 7; the limiting component 6021 is fixed to one end of the telescopic rod 6022 close to the supporting surface 2, one end of the elastic component 6023 is connected to the limiting component 6021, and the other end of the elastic component 6023 is connected to the second bayonet structure 12; herein, the elastic component 6023 is in a compressed state.

When the protrusion amount of the first adjusting substructure 601 protruding from the side wall of the receiving hole 8 increases, the first adjusting substructure 601 can push the limiting component 6021 and the telescopic rod 6022 to move along the receiving groove toward a side close to the assembly surface 3, so that the protrusion amount of the telescopic rod 6022 protruding through the first opening 7 increases; when the protrusion amount of the first adjusting substructure 601 protruding from the side wall of the receiving hole 8 is reduced, the limiting component 6021 and the telescopic rod 6022 are pushed by the elastic force of the elastic component 6023 to move along the receiving groove toward a side away from assembly surface 3, so that the protrusion amount of the telescopic rod 6022 protruding through the first opening 7 is reduced.

In some embodiments, the receiving hole 8 includes a first portion 801 and a second portion 802 disposed in the first direction X, the first portion 801 is located on a side of the second portion 802 away from the assembly face 3, and the duct 5 communicates with a sidewall of the first portion 801; the sectional area of the limiting component 6021 parallel to the assembly surface 3 is less than that of the first portion 801 parallel to the assembly surface 3, the sectional area of the limiting component 6021 parallel to the assembly surface 3 is greater than that of the second portion 802 parallel to the assembly surface 3, and the sectional area of the second portion 802 parallel to the assembly surface 3 is greater than that of the telescopic rod 6022 parallel to the assembly surface 3.

With continued reference to FIG. 5 to FIG. 8, in some embodiments, the first adjusting substructure 601 includes a machine-processed rice screw, and the inner wall of the duct 5 is provided with an internal thread (not shown) that match the external thread of the machine-processed rice screw. That is, the protrusion amount of the machine-processed rice screw protruding from the side wall of the receiving hole 8 can be controlled by inserting the external jig into the duct 5 and rotating it.

In some embodiments, the receiving hole 8 traverses from the assembly surface 3 to the supporting surface 2, and forms a second opening 9 in the supporting surface 2, in which case the receiving hole 8 is a through hole. By providing the aforementioned second opening 9, it facilitates the placement of the second adjusting substructure 602 inside the receiving hole 8.

Referring further to FIG. 2, FIG. 5, and FIG. 7, in some embodiments, the angle between the extension direction of the duct 5 and the first direction X is 20° to 80°. In practical application, the angle between the extension direction of the duct 5 and the first direction X can be set according to actual needs.

Figure 9:
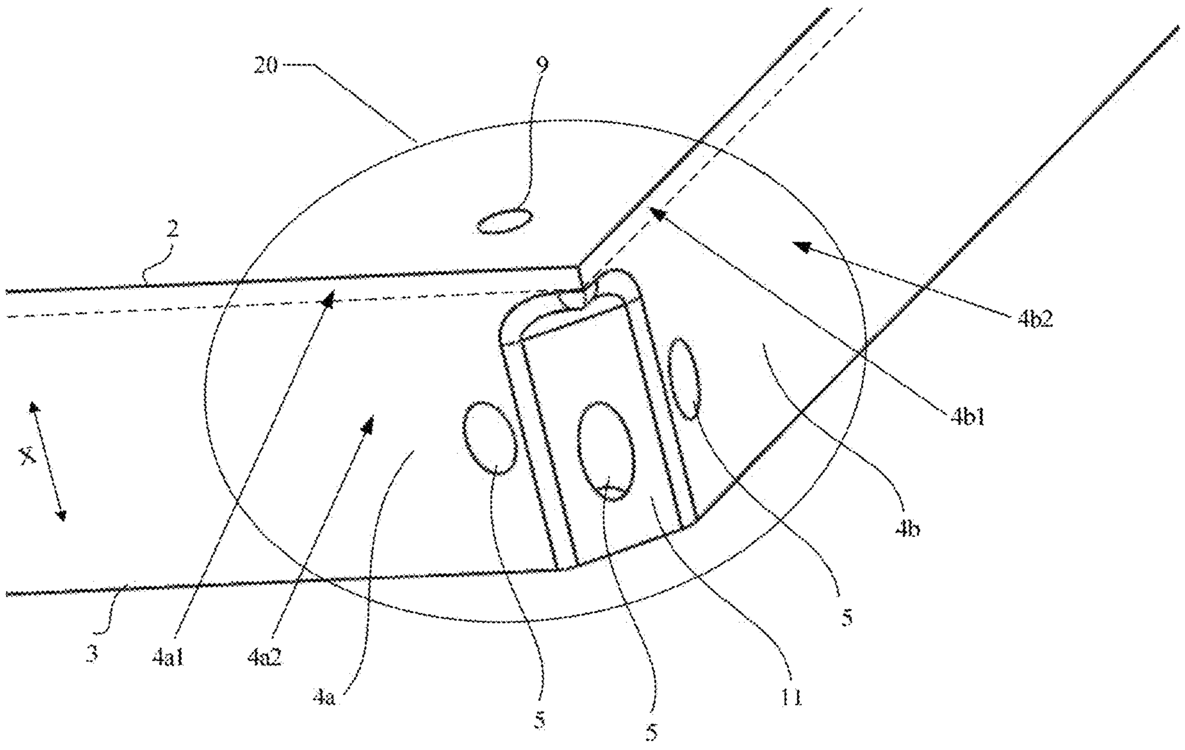
FIG. 9 is a schematic diagram of a structure of the bracket structure in a corner area in an embodiment of the present disclosure.
Figure 10:
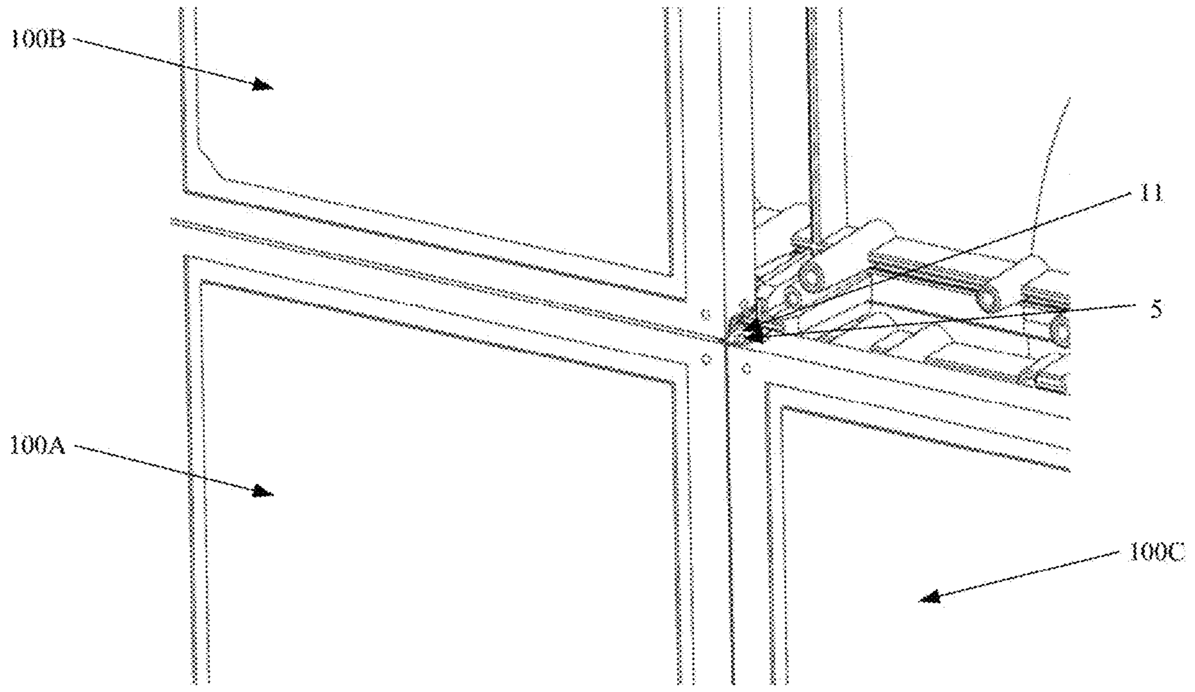
FIG. 10 is a schematic diagram of a structure of splicing three bracket structures in an embodiment of the present disclosure.

FIG. 9 is a schematic diagram of a structure of the bracket structure in a corner area in an embodiment of the present disclosure. FIG. 10 is a schematic diagram of a structure of splicing three bracket structures in an embodiment of the present disclosure. As shown in FIGS. 9 and 10, as depicted in FIG. 9, in some embodiments, the bracket body 1 includes at least one corner area 20 in which a first side surface **4*a*, a second side surface 4*b* and a chamfered side surface 11 connecting the first side surface 4*a* and the second side surface 4*b* are provided; the duct 5 is provided on the chamfered side surface 11**.

In an embodiment of the present disclosure, by providing a chamfered side surface 11 between the first side surface **4*a* and the second side surface 4*b* in the corner area 20 and providing a duct 5 in the chamfered side surface 11, it is possible for an assembler to adjust the position of the supporting surface of the bracket structure through the duct 5 in the chamfered side surface 11 in the condition that both the first side surface 4*a* and the second side surface 4*b*** are shielded by other bracket structures.

The housing includes an installation surface which includes a plurality of areas to be assembled with bracket structures (sub-display panel assemblies) that carry display substrates, and the plurality of areas are distributed in an n*m array; during the installation process of the bracket structure, it is common to install them in a row by row manner on the installation surface. As an example, the installation is done row by row from bottom to top on the installation surface. Taking the case shown in FIG. 10 as an example, first, the bracket structure 100A is installed; then, the bracket structure 100C is installed at the right side surface of the bracket structure 100A. At this time, the installation of the lower row of bracket structures is completed; next, the bracket structure 100B is installed at the upper side surface of the bracket structure 100A. At this time, the right side surface of the bracket structure 100A is shielded by 100C, and the upper side surface of the bracket structure 100A is shielded by 100B, but the chamfered side surface 11 of the bracket structure 100A, which is located on the upper side surface and the right side surface (i.e., the first side surface and the second side surface of the aforementioned corner area), is exposed. At this time, the position of the supporting surface of the bracket structure 100A can be adjusted through the duct 5 in the chamfered side surface 11.

With continued reference to FIG. 1, in some embodiments, the bracket body 1 is in a shape of a polygon, and includes a plurality of corner areas 20, each of which is located in an area where a corner of the polygon is located. With continued reference to FIG. 9, in some embodiments, the first side surface 4*a*, the second side surface 4*b* and the chamfered side surface 11 within a same corner area 20 are each provided with a duct 5. In an embodiment of the present disclosure, the first side surface 4*a*, the second side surface 4*b* and the chamfered side surface 11 in a same corner area 20 are each provided with a duct 5, which can respond to the need for adjustment in more different scenarios.

In some embodiments, within a same corner area 20, the duct 5 on the first side surface 4*a*, the duct 5 on the second side surface 4*b* and the duct 5 on the chamfered side surface 11, all three of the ducts 5 have one end in communication with the same first opening 7.

In some embodiments, within the corner area 20, the first side surface 4*a* includes a first area 4*al* close to the supporting surface 2 and a second area 4*a*2 close to the assembly surface 3, the second side surface 4*b* includes a third area 4*b*1 close to the supporting surface 2 and a fourth area 4*b*2 close to the assembly surface 3, the first area 4*al* and the second area 4*a*2 are arranged along the first direction X, the third area 4*b*1 and the fourth area 4*b*2 are arranged along the first direction X; the first area 4*al* is directly connected with the third area 4*b*1, and the second area 4*a*2 is connected with the fourth area 4*b*2 via the chamfered side surface 11. That is, the portion of the side of the bracket structure close to the supporting surface 2 is not chamfered in the corner area 20 so as to avoid splicing seams in the corner area 20.

It should be noted that, in an embodiment of the present disclosure, it is possible to place the adjusting structure 6 in each duct 5 in advance, and then the display substrate is assembled on the bracket body to form a sub-display panel assembly, and then the sub-display panel assembly is assembled with the housing. That is, a corresponding adjusting structure 6 is provided in each duct 5. In addition, in an embodiment of the present disclosure, it is also possible to not place the adjusting structure 6 in the duct 5 before the display substrate is assembled on the bracket body, and after the display substrate is assembled on the bracket body to form a sub-display panel assembly and the sub-display panel assembly is assembled with the housing, if the position of the supporting surface 2 of the bracket structure needs to be adjusted, then the adjusting structure 6 may be selectively placed in some ducts 5 for adjustment. In other words, in practical applications, it is possible that there is an adjusting structure 6 in some ducts 5 and no adjusting structure 6 in other ducts 5 (for example, in the case shown in FIG. 9, the adjusting structure 6 in FIG. 2 or the first adjusting substructure in FIG. 5 and FIG. 7 may be selectively placed in one of the duct 5 on the first side surface 4*a*, the duct 5 on the second side surface 4*b* and the duct 5 on the chamfered side surface 11 within a same corner area 20, according to actual needs). In the present disclosure, it is only necessary to ensure that the quantity of ducts 5 is greater than or equal to the quantity of adjusting structures 6.

In addition, when the adjusting structure 6 are used in the manner shown in FIGS. 5 and 7, the second adjusting substructure 602 needs to be placed in the second receiving hole 8 before the display substrate is assembled to the bracket structure, and the first adjusting substructure 601 may be placed in the duct 5 before the display substrate is assembled to the bracket structure, or may be placed in the duct 5 as required after the bracket structure is assembled to the housing.

The technical solutions of the present disclosure are not limited as to the quantity of ducts 5 provided on the side surface of the bracket body, the position of the ducts 5 on the side surface of the bracket body 1, and the included angle between the extension direction of the duct 5 and the first direction X.

Based on the same inventive concept, an embodiment of the present disclosure also provides a sub-display panel assembly, wherein the sub-display panel assembly includes a bracket structure and a display substrate, wherein a supporting surface in the bracket structure carries the display substrate; wherein the bracket structure may adopt the bracket structure provided in the above embodiment.

Based on the same inventive concept, an embodiment of the present disclosure also provides a spliced display apparatus, including a plurality of sub-display panel assemblies and a housing for assembling the sub-display panel assemblies and at least one sub-display panel assembly adopts the sub-display panel assembly provided in the above embodiment.

In accordance with the embodiments of the present invention such as those described above, these embodiments are not an exhaustive recitation of all details and do not limit the invention to the specific embodiments described only. Obviously, many modifications and variations may be made in accordance with the above description. These embodiments are selected and specifically described in this specification in order to better explain the principles and practical applications of the present invention, so that those skilled in the art can make good use of the present invention as well as modifications based on the use of the present invention. The present invention is limited only by the claims and their full scope and equivalents.

The invention claimed is:

1. A bracket structure comprising: a bracket body and at least one adjusting structure, wherein the bracket body has a supporting surface, an assembly surface and at least one side surface, the supporting surface is disposed opposite to the assembly surface in a first direction, and the side surface is located between the supporting surface and the assembly surface;

the at least one side surface is provided with at least one duct extending towards the assembly surface, an extension direction of the duct intersects with the assembly surface, the assembly surface is provided with a first opening corresponding to the duct, and the first opening is communicated with the corresponding duct;

the adjusting structure is configured such that at least a portion of the adjusting structure, in response to an external adjustment, can move along the duct and change a protrusion amount of the adjusting structure protruding from the assembly surface through the first opening.

2. The bracket structure according to claim 1, wherein the duct extends from the side surface to the assembly surface in a preset extension direction.

3. The bracket structure according to claim 2, wherein the adjusting structure comprises: a machine-processed rice screw, and an internal thread matched with an external thread of the machine-processed rice screw is arranged in the duct.

4. The bracket structure according to claim 1, wherein a receiving hole communicating with the first opening is formed in the bracket body at a position corresponding to the first opening, and the duct is connected to a side wall of the receiving hole;

the adjusting structure comprises: a first adjusting substructure which is located in the duct and can move along the duct and a second adjusting substructure which is located in the receiving hole and can move along a direction perpendicular to the assembly surface;

the first adjusting substructure is configured to move along the duct to adjust a protrusion amount of the first adjusting substructure from a sidewall of the receiving hole in response to the external adjustment;

the second adjusting substructure is configured to come into contact with a portion of the first adjusting substructure protruding from the side wall of the receiving hole, and is moved in a direction close to or away from the first opening in response to control of movement of the first adjusting substructure, to adjust a protrusion amount of the second adjusting substructure protruding from the assembly surface through the first opening.

5. The bracket structure according to claim 4, wherein when the second adjusting substructure comes into contact with the portion of the first adjusting substructure protruding from the side wall of the receiving hole, the second adjusting substructure moves in the receiving hole in a direction close to the first opening in response to the first adjusting substructure moving along the duct in a direction close to the assembly surface, and the second adjusting substructure moves in the receiving hole in a direction away from the first opening in response to the first adjusting substructure moving along the duct in a direction away from the assembly surface.

6. The bracket structure according to claim 5, wherein the second adjusting substructure comprises: a first portion close to the first opening;

a sectional area of the first portion parallel to the assembly surface gradually increases in a direction along the first direction and directed from the assembly surface to the supporting surface;

an area of the first opening is less than a maximum sectional area of the first portion parallel to the assembly surface.

7. The bracket structure according to claim 6, wherein a sectional area of the receiving hole in parallel to the assembly surface gradually increases in a direction along the first direction and directed from the assembly surface to the supporting surface.

8. The bracket structure according to claim 6, wherein the first portion is hemispherical, conical, or frustoconical.

9. The bracket structure according to claim 6, wherein a first bayonet structure is formed at the first opening.

10. The bracket structure according to claim 6, wherein the second adjusting substructure comprises: a limiting component, a telescopic rod and an elastic component, and a second bayonet structure for protrusion of the telescopic rod is formed at the first opening;

the limiting component is fixed at an end of the telescopic rod close to the supporting surface, one end of the elastic component is connected with the limiting component, and the other end of the elastic component is connected with the second bayonet structure.

11. The bracket structure according to claim 10, wherein the receiving hole comprises: a first portion and a second portion disposed in the first direction, the first portion is located on a side of the second portion away from the assembly surface, and the duct is connected to a sidewall of the first portion;

a sectional area of the limiting component parallel to the assembly surface is less than a sectional area of the first portion parallel to the assembly surface, the sectional area of the limiting component parallel to the assembly surface is greater than a sectional area of the second portion parallel to the assembly surface, and the sectional area of the second portion parallel to the assembly surface is greater than a sectional area of the telescopic rod parallel to the assembly surface.

12. The bracket structure according to claim 4, wherein the receiving hole is connected to the supporting surface.

13. The bracket structure according to claim 4, wherein the first adjusting substructure comprises: a machine-processed rice screw, and an internal thread matched with an external thread of the machine-processed rice screw is arranged in the duct.

14. The bracket structure according to claim 1, wherein the bracket body comprises at least one corner area, a first side surface, a second side surface, and a chamfered side surface connected between the first side surface and the second side surface are provided in the corner area;

the chamfered side surface is provided with the duct.

15. The bracket structure according to claim 14, wherein the duct is provided on the first side surface, the second side surface and the chamfered side surface in a same corner area.

16. The bracket structure according to claim 14, wherein in the corner area, the first side surface comprises a first area close to the supporting surface and a second area close to the assembly surface, the second side surface comprises a third area close to the supporting surface and a fourth area close to the assembly surface, the first area and the second area are arranged along the first direction, the third area and the fourth area are arranged along the first direction;

the first area is directly connected to the third area, and the second area is connected to the fourth area through the chamfered side surface.

17. The bracket structure according to claim 14, wherein the bracket body is in a shape of rectangle, and the bracket body comprises four corner areas.

18. The bracket structure according to claim 1, wherein an angle between the extension direction of the duct and the first direction is 20° to 80°.

19. A sub-display panel assembly comprising a bracket structure according to claim 1 and a display substrate, the supporting surface in the bracket structure carrying the display substrate.

20. A spliced display apparatus comprising a plurality of sub-display panel assemblies and a housing for assembling the sub-display panel assemblies, at least one of the sub-display panel assemblies adopting the sub-display panel assembly according to claim 19.

* * * * *